United States Patent [19]

Tsugeno et al.

[11] Patent Number: 5,266,289
[45] Date of Patent: Nov. 30, 1993

[54] PROCESS FOR PRODUCING HIGH-PURITY SILICA BY REACTING CRUDE SILICA WITH AMMONIUM FLUORIDE

[75] Inventors: Makoto Tsugeno; Kenji Tanimoto, both of Fuchu; Masao Kubo, Tokyo, all of Japan

[73] Assignee: Nissan Chemical Industries Ltd., Tokyo, Japan

[21] Appl. No.: 612,475

[22] Filed: Nov. 14, 1990

[30] Foreign Application Priority Data

Nov. 16, 1989 [JP] Japan .................................. 1-298443

[51] Int. Cl.$^5$ ............................................. C01B 33/12
[52] U.S. Cl. ..................................... 423/339; 423/335; 423/471
[58] Field of Search .............................. 423/338–340, 423/471, 335

[56] References Cited

U.S. PATENT DOCUMENTS

| | | | |
|---|---|---|---|
| 1,859,998 | 5/1932 | Svendsen . | |
| 1,959,749 | 5/1934 | Svendsen . | |
| 2,381,843 | 8/1945 | Sherlock | 423/340 |
| 3,808,309 | 4/1974 | Daiga et al. | 423/340 |
| 5,028,407 | 7/1991 | Chieng et al. | 423/338 |
| 5,064,473 | 11/1991 | Kubo et al. | 106/287.34 |

FOREIGN PATENT DOCUMENTS

| | | |
|---|---|---|
| 0326707 | 8/1989 | European Pat. Off. . |
| 0337712 | 10/1989 | European Pat. Off. . |
| 62-153111 | 7/1987 | Japan . |
| 62-288110 | 12/1987 | Japan . |
| 1130526 | 12/1984 | U.S.S.R. . |
| 555241 | 8/1943 | United Kingdom ................ 423/340 |

OTHER PUBLICATIONS

Chemical Abstracts, vol. 102, No. 20, p. 141, May 20, 1985, A. N. Murashkevich, et al., "Siliva", 102: 169148q.

Chemical Abstracts, vol. 72, No. 6, p. 524, Feb. 9, 1970, V. D. Bratishko, et al., "Reaction of Silicon Dioxide with Ammonium Bifluoride", 27935g.

Chemical Abstracts, vol. 95, No. 18, p. 427, Nov. 2, 1981, S. Hanafi, et al., "Effect of Fluorination on the Surface Texture of Silica Gel", 95:157174u.

Encyclopedia of Chemical Technology, vol. 10, p. 677, 1980, "Uses Based on Reactions with Silicates", Kirk-Othmer.

*Primary Examiner*—Olik Chaudhuri
*Assistant Examiner*—Ken Horton
*Attorney, Agent, or Firm*—Oblon, Spivak, McClelland, Maier & Neustadt

[57] ABSTRACT

A process for producing a high-purity silica, which comprises the steps of reacting a crude silica with ammonium fluoride, acid ammonium fluoride or a mixture thereof in an aqueous medium to produce ammonium silicofluoride, separating the ammonium silicofluoride from an unreacted silica and impurities by the means of a solid/liquid separation, and reacting the thus-obtained ammonium silicofluoride with ammonia in an aqueous medium. This process is a low cost process, and enables to control properties of silica.

9 Claims, No Drawings

PROCESS FOR PRODUCING HIGH-PURITY SILICA BY REACTING CRUDE SILICA WITH AMMONIUM FLUORIDE

BACKGROUND OF THE INVENTION

The present invention relates to a process for producing a high-purity silica from a crude silica such as a compound or a mixture which is usable as a source for a silica.

There is an increasing demand for a high-purity silica as a functional material such as a material of quartz, a ceramic material and a filling material.

Conventionally, a process for producing a silica by neutralizing sodium silicate with an acid or an ion exchange resin (sodium silicate method) is known. This process, however, is not suitable as a process for producing a high-purity silica in spite of a low cost, because metallic impurities such as sodium, aluminum and iron are contained therein.

As a dry process, a process for producing a silica by combustion of silicon tetrachloride at a high temperature in the presence of oxygen and hydrogen is known. This process, however, restricted to a narrow range of use due to a high cost. In addition, the properties of the silica obtained by the dry process is different from those obtained by a wet process, the control of the properties of the silica is difficult.

Further, as a process for producing a silica from silicofluoride, are known a process for producing a hydrated silica and ammonium fluoride, which comprises heating a silica to a bright red heat, treating the silica with ammonium fluoride under heating thereby forming silicon fluoride, ammonium silicofluoride and/or silicon diamino tetrafluoride, volatilizing the silicon fluoride, ammonium silicofluoride and/or silicon diamino tetrafluoride thereby collecting them, and treating the collected material with water and ammonia [U.S. Pat. Nos. 1,859,998 and 1,959,749]; a process for producing a silica, which comprises dissolving a compound or a mixture which is usable as a source for a silica, in a mixed solution of hydrofluoric acid and sulfuric acid, distilling a fluoride of silicon from the resultant solution, and adding ammonium to the distillate [Japanese Patent Application Laid-Open (KOKAI) No. 62-153,111 (1987)]; and a process for producing a silica and ammonium fluoride, which comprises recovering silicon tetrafluoride-containing gas from the acidulation of a fluoride-containing phosphorus source such as a phosphorus-containing rock, absorbing the resultant gas in water or a solution of ammonium fluoride thereby obtaining an fluosilicic acid or ammonium fluosilicate solution, further converting the fluosilicic acid to ammonium fluoride in the case of fluosilicic acid solution, and ammoniating said ammonium fluosilicate solution [European Patent Application Publication No. 0,337,712].

The process disclosed in U.S. Pat. No. 1,859,998 and U.S. Pat. No. 1,959,749 is complicated and has a problem in selection of materials constituting an apparatus due to the high volatilizing temperature (about 300° C.), and therefore this process cannot be said to be a preferred industrial process. The process disclosed in Japanese Patent Application Laid-Open (KOKAI) No. 62-153,111 cannot be said to be an industrial process because it uses hydrofluoric acid which costs much, and by using a considerably large amount of sulfuric acid, a waste acid is produced as a by-product. The process disclosed in European Patent Application Publication No. 0,337,712 has no industrial merit in case that it is not combined to a manufacturing plant for a wet phosphoric acid process. Also, the process of purification in gaseous state has a problem of a loss in absorption step of a gas and of a trouble in the operation by scaling of silica, and further a high cost of the apparatus.

As a result of studies undertaken by the present inventors so as to solve these problems, it has been found that by producing ammonium silicofluoride from a crude silica and ammonium fluoride, acid ammonium fluoride of a mixture thereof, separating the impurities from the reaction product by utilizing the difference in solubility, and reacting the thus-obtained purified ammonium silicofluoride with ammonia in an aqueous medium, a high-purity silica is obtained. The present invention has been accomplished on the basis of this finding.

SUMMARY OF THE INVENTION

It is an object of the present invention to provide a low cost process for producing a high-purity silica from a crude silica, and enabling to control properties of the silica.

In a first aspect of the present invention, there is provided a process for producing a high-purity silica, which comprises the steps of reacting a crude silica with ammonium fluoride, acid ammonium fluoride or a mixture thereof in an aqueous medium to produce ammonium silicofluoride, separating the ammonium silicofluoride from an unreacted silica and impurities by the means of a solid/liquid separation, and reacting the thus-obtained ammonium silicofluoride with ammonia in an aqueous medium.

In a second aspect of the present invention, there is provided a process for producing a high-purity silica, which comprises the steps of reacting a crude silica with an acid component and ammonium fluoride, acid ammonium fluoride or a mixture thereof in an aqueous medium to produce ammonium silicofluoride, separating the ammonium silicofluoride from an unreacted silica and impurities by the means of separating a solid/liquid separation, and reacting the thus-obtained ammonium silicofluoride with ammonia in an aqueous medium.

In a third aspect of the present invention, there is provided a process for producing a high-purity ammonium silicofluoride.

DETAILED DESCRIPTION OF THE INVENTION

The crude silica which is used in the present invention as a raw material is a silica containing impurities (silicic acid anhydride, hydrated silica, a siliceous mineral, silica glass, etc.), a compound containing a silica component (a silicate, etc.) or a mixture containing a silica. For example, diatomaceous earth, silicic anhydride, silica sand, rice hull ash, and minerals containing silicate, all of which are obtained as a natural mineral, are usable. In addition, those which are known as a synthetic silica, such as silica fume which is generated from the dust from the waste gas generated during the production of ferrosilicon, fly ash which is a by-product from a coal heat power plant, blast furnace slag, silica produced by a sodium silicate process, and a silica produced by combustion of metallic silicon or silicon tetrachloride under high temperature, are also usable. The silica content of the crude silica is preferably as high as possible, and ordinarily it is not less than 20 wt %, preferably not less than 50 wt %, more preferably not less than 80 wt %.

The ammonium fluoride used in the present invention may be a powder or an aqueous solution which is available as a reagent or an industrial chemical. But it is preferable to recycle the ammonium fluoride which is a by-product contained in the mother liquor when reacting hydrosilicofluoric acid and/or ammonium silicofluoride with ammonia in an aqueous medium and separating a silica as described later.

As an aqueous medium, water and an inert organic solvent which reacts with neither a raw material nor a product are usable. Water is preferable in the respect of handling.

The reaction of a crude silica and ammonium fluoride is ordinarily carried out in an aqueous medium under heating.

The reaction of a silica and ammonium fluoride in an aqueous medium is represented by the following reaction formula:

$$SiO_2 + 6NH_4F \rightarrow (NH_4)_2SiF_6 + 2H_2O + 4NH_3 \uparrow$$

The amount of ammonium fluoride used is different depending upon the reactivity of the crude silica used and a target reaction rate of a crude silica, but the amount which is sufficient for changing the silica contained in the raw material into a silicofluoride is enough. Ordinarily, the amount of ammonium fluoride is 0.5 to 20, preferably 1 to 15, more preferably 2 to 12 in the molar ratio base on the $SiO_2$ in the crude silica. The more excess amount of ammonium fluoride is used, the higher is the reaction rate of a crude silica.

The reaction temperature is different depending upon the pressure at the reaction and is not specified, but it is ordinarily not less than 50° C., preferably not less than 70° C., and a preferred upper limit of the reaction temperature is a boiling point of the reaction solution. When the pressure is normal pressure or a reduced pressure, the reaction temperature is preferably 50° to 110° C.

The reaction pressure is ordinarily normal pressure or a reduced pressure, but the reaction can be carried out under pressure while taking out ammonia. The by-product ammonia is ordinarily discharged out of the system, and it is possible to collect them as a ammonium water through a condenser and, if necessary, by a absorption in an aqueous solution or the like. The collected ammonia water is usable as raw material for the subsequent reaction process. It is possible to adopt a method of discharging the by-product ammonia gas by bubbling an inert gas in the reaction system.

The reaction may be carried out either in a batch process or a continuous process. The reaction time is different depending upon reaction processes, kinds of the raw material, the concentration of the raw material and the conditions for the reaction, and is not specified, but it is ordinarily within 10 minutes to 50 hours, preferably 1 to 20 hours.

Further, acid ammonium fluoride may be used instead of ammonium fluoride. In the case that acid ammonium fluoride is used, the reaction can be carried out at a lower temperature compared with the case that ammonium fluoride is used.

The main reaction of a silica and acid ammonium fluoride in an aqueous medium is represented by the following reaction formulae:

$$SiO_2 + 3NH_4 \cdot HF_2 \rightarrow (NH_4)_2SiF_6 + 2H_2O + NH_3 \uparrow$$

$$SiO_2 + 4NH_4 \cdot HF_2 \rightarrow (NH_4)_2SiF_6 + 2H_2O + 2NH_4F$$

As acid ammonium fluoride, an industrial chemical and so like may be used. It is also usable a deammoniation reaction product obtained by concentrating under heating ammonium fluoride mother liquor obtained in the process for producing a silica. The product can be obtained by the deammoniation reaction (reaction in which ammonia is removed) represented by the following reaction formula:

$$2NH_4F \rightarrow NH_4 \cdot HF_2 + NH_3 \uparrow$$

In the above reaction, high temperature of not less than 100° C. is required in order to raise the reaction rate, the deammoniation reaction is ordinarily carried out at 20 to 80% of the deammoniation reaction rate, and an aqueous solution (a mixed solution or a mixed slurry) of ammonium fluoride and acid ammonium fluoride is added to reaction mixture.

As the other method for obtaining acid ammonium fluoride, a method of deammoniation of ammonium fluoride by using a cation exchange resin is further exemplified. Acid ammonium fluoride or a mixture of acid ammonium fluoride and ammonium fluoride is obtained by using a cation exchange resin such as a cation exchange resin having sulfonic acid group or a cation exchange resin having carboxylic acid group. For example:

$$2NH_4F + R-SO_3H \rightarrow NH_4 \cdot HF_2 + R-SO_3NH_4$$

$$3NH_4F + R-SO_3H \rightarrow NH_4 \cdot HF_2 + NH_4F + R-SO_3NH_4$$

($R-SO_3H$: A cation exchange resin)

The obtained acid ammonium fluoride or the obtained mixture of acid ammonium fluoride and ammonium fluoride can be used for the reaction with a crude silica.

Acid ammonium fluoride or a mixture of acid ammonium fluoride and ammonium fluoride is ordinarily used in the same amount, based on F, as singly-used ammonium fluoride.

An acid component may be added to the reaction system of a crude silica with ammonium fluoride, acid ammonium fluoride or mixture thereof. As an acid component, hydrofluoric acid, hydrosilicofluoric acid, sulfuric acid, hydrochloric acid, nitric acid and cation exchange resins are exemplified. Hydrofluoric acid, hydrosilicofluoric acid and cation exchange resins are preferable as the acid component, and hydrofluoric acid is more preferable. In the case that hydrofluoric acid is used, a by-product of a ammonium fluoride solution can be recycled, because hydrofluoric acid can be obtained by means of deammoniation by treating a by-product of a ammonium fluoride solution described below with a cation exchange resin:

$$NH_4F + R-SO_3H \rightarrow HF + R-SO_3NH_4$$

($R-SO_3H$: A cation exchange resin)

By adding an acid, the reaction is facilitated and the reaction time is shortened.

For example, the reaction of a silica with ammonium fluoride and an acid component in an aqueous medium is represented by the following reaction formula(e):

In the case that hydrofluoric acid is used:

$$SiO_2 + 5NH_4F + HF \rightarrow (NH_4)_2SiF_6 + 2H_2O + 3NH_3 \uparrow$$

$$SiO_2 + 2NH_4F + 4HF \rightarrow (NH_4)_2SiF_6 + 2H_2O$$

In the case that hydrosilicofluoric acid is used:

$$SiO_2 + 6NH_4F + H_2SiF_6 \rightarrow 2(NH_4)_2SiF_6 + 2H_2O + 2NH_3 \uparrow$$

In the case that a cation exchange resin is used:

$$SiO_2 + 6NH_4F + 4R\!-\!SO_3H \rightarrow (NH_4)_2SiF_6 + 4R\!-\!SO_3NH_4 + 2H_2O$$

In the case that sulfuric acid is used:

$$SiO_2 + 6NH_4F + 2H_2SO_4 \rightarrow (NH_4)_2SiF_6 + 2(NH_4)_2SO_4 + 2H_2O$$

The reaction of a crude silica with acid ammonium fluoride and hydrofluoric acid is represented by the following formula:

$$SiO_2 + 2NH_4 \cdot HF_2 + 2HF \rightarrow (NH_4)_2SiF_6 + 2H_2O$$

The amount of an acid component is different depending upon kinds of an acid component, but it is 0.1 to 6, preferably 0.5 to 4 in ratio of acid equivalent to one mole of $SiO_2$. In the case of the reaction in which no ammonia is generated, the reaction is ordinarily carried out at a temperature of not more than 100° C., especially at 50° to 80° C. according to kinds of a crude silica and the reaction conditions.

Further, the process for producing ammonium silicofluoride may be carried out by the combination of the reactions described above.

In the process of the present invention, the ammonium silicofluoride obtained in the above-described reaction is separated and purified.

In the separating and purifying process, when insoluble impurities are contained in the aqueous medium in which the ammonium silicofluoride produced is dissolved, the solid material is separated from the solution under heating or at normal temperature by means of a solid/liquid separation such as filtration and centrifugal separation. It is possible to add ammonia to the mother liquor so as to obtain a silica. Also, a method of purifying ammonium silicofluoride by cooling the mother liquor in which ammonium silicofluoride is dissolved, concentrating the mother liquor, if necessary, so as to separate out the ammonium silicofluoride as white crystals and filtering out the resultant white crystals is preferably adopted, because it is possible to remove the water-soluble impurities.

In order to obtain a further higher-purity silica, it is preferable to purify by recrystallization or the like the white crystals of ammonium silicofluoride obtained in the above-described manner. For recrystallization, an ordinary recrystallization method is adopted in which the crystals are dissolved in hot water, and after the solution is filtered under heating and the filter cake is removed, the solid content is crystallized from the mother liquor. The crystallization of ammonium silicofluoride has a much purification effect when it is carried out in an acidic atmosphere.

The purity of the obtained ammonium silicofluoride is different depending upon the purity of a raw material and conditions for the reaction. Ordinarily, in the case that a crude silica containing not more than 10 wt % of each of metal impurities is used, ammonium silicofluoride crystals containing not more than 1000 ppm of each of metal impurities can be obtained, and further, according to the reaction conditions and kinds of a crude silica, ammonium silicofluoride crystals containing not more than 10 ppm of each of impurities can be obtained. Especially, in the case that a crude silica containing not more than 1000 ppm of each of metal impurities is used, ammonium silicofluoride crystals containing not more than 100 ppm of each of metal impurities can be obtained, and further, according to the reaction conditions, ammonium silicofluoride crystals containing not more than 1 ppm of each of metal impurities can be obtained.

Thus-obtained ammonium silicofluoride is next reacted with ammonia in an aqueous medium to obtain a silica.

The reaction of ammonium silicofluoride and ammonia is represented by the following reaction formula:

$$(NH_4)_2SiF_6 + 4NH_3 + 2H_2O \rightarrow SiO_2 + 6NH_4F$$

For this reaction, ammonia may be used in the form of either gas or an aqueous ammonia solution having a high purity is used.

The reaction temperature is 0° to 100° C., preferably in the range of room temperature to 80° C. If the reaction is carried out under pressure, the temperature may exceed 100° C.

The amount of ammonia used for the reaction with ammonium silicofluoride is stoichiometrically 4 in a molar ratio to the ammonium silicofluoride, but it is ordinarily 3 to 10, preferably 4 to 6 in a molar ratio to the ammonium silicofluoride. A use of excess of ammonia over the stoichiometrical value is preferable. Ammonia is preferably supplied to the reaction system continuously or stepwise. When ammonia is supplied, the time for supplying ammonia is not specified but ordinarily 5 minutes to 10 hours, preferably 10 minutes to 5 hours. A method of charging ammonia into the reaction system followed by addition of ammonium silicofluoride and a method of simultaneously adding ammonia and ammonium silicofluoride may be also used. It is possible to age the resulting product for 15 minutes to 5 hours after the end of the addition of ammonia.

The silica produced is separated from the resulted slurry by an ordinary solid/liquid separating means (by means of separating a solid from a liquid) such as filtration and centrifugal separation, washed and dried to obtain a high-purity silica of the present invention. Since ammonium fluoride produced as a by-product during the solid/liquid separation is contained in the form of a solute in the mother liquor from which the silica is separated, it is preferable to use the mother liquor for he first step as a recycle.

The separated silica wet cake is washed with pure water. If ammonia or the like remains in the wet cake, it is washed with a dilute solution of an acid such as nitric acid and sulfuric acid, if necessary, and thereafter washed with water. As the water and the acid used for washing are substantially those which do not contain impurities (especially metal ingredients). The silica slurry before the saparation may be washed by an acid solution (The silica may be washed in the state of a slurry).

When the wet cake is dried after washing, an ordinary method such as hot-air drying, vacuum drying, spray drying, flash drying and fluidized drying is applied in a temperature of 50° to 200° C. If necessary, drying or calcination at a temperature of not lower than 200° C. may be applied.

In the preparation process of the present invention, by heating a crude silica together with ammonium fluoride, deammoniation is accelerated and ammonium silicofluoride is generated. The impurities in the crude silica are removed by utilizing the difference in solubility between the impurities and ammonium silicofluoride in an aqueous medium, and by reacting the thus purified ammonium silicofluoride with ammonia in an aqueous medium, it is possible to obtain a high-purity silica.

The purity of the obtained silica is different depending upon the purity of a raw material and conditions for the reaction. Ordinarily, in the case that a crude silica containing not more than 10 wt % of each of metal impurities is used, a silica containing not more than 1000 ppm of each of metal impurities can be obtained, and further, according to the reaction conditions and kinds of a crude silica, a silica containing not more than 10 ppm of each of metal impurities can be obtained. Especially, in the case that a crude silica containing not more than 1000 ppm of each of metal impurities is used, a silica containing not more than 100 ppm of each of metal impurities can be obtained, and further, according to the reaction conditions, a silica containing not more than 1 ppm of each of metal impurities can be obtained.

Further, the process of the present invention enables to control properties of a silica. According to the process, properties of a silica (powder) such as particle size, form of the particle, specific surface area, ignition loss, and content of silanol group on the surface can be controlled to obtain a silica which is highly active and is excellent in dispersibility in a place where it is used.

Since it is possible to recycle ammonium fluoride produced by the reaction between ammonium silicofluoride and ammonia in an aqueous medium for the reaction at the first step, the process according to the present invention does not require an expensive raw material or a treatment of by-products unlike in the prior art. Thus, the present invention provides an economical and clean industrial process for producing a silica and ammonium silicofluoride by using a cheap raw material and recycling of a by-product.

The reaction formulae described above are used for the purpose of explaining the present invention. Therefore, the present invention is not limited to these reaction formulae, in so far as it satisfies the object the present invention.

EXAMPLES

The present invention will be explained in more detail with reference to the following examples and comparative examples, but it should be noted that the present invention is not limited to the examples. "%" in the examples means wt %.

The contents of metal impurities in a silica, and properties of a silica were evaluated according to the followings:

(1) The contents of metal impurities

After a sample was dissolved by hydrofluoric acid, the contents of metal impurities were determined according to ICP (Inductivity Coupled Plasma) emission spectroscopic analysis.

(2) Specific surface area

Measured according to BET method with using nitrogen.

(3) Average particle size

Measured by a laser diffraction particle size distribution analyzer.

(4) Ignition loss

After a sample which was previously dried at 105° C. was heated at 950° C. for 1 hour, a loss in weight was measured.

(5) Dispersibility in water

Evaluated by visually, after stirring 10 weight % aqueous slurry of a silica. "Poor" means that the silica settles immediately in water, and "good" means that the silica disperses and does not settle immediately in water.

The contents of metal impurities in ammonium silicofluoride crystals were determined by dissolving the crystal to water and measuring the contents in the aqueous solution by ICP emission spectroscopic analysis.

EXAMPLE 1

Into a 1-l Teflon container equipped with an agitating element and a thermometer, 60 g of silica fume (SF powder; trade name, produced by Japan Metals and Chemicals Co., Ltd., containing 92.4% of $SiO_2$) as a crude silica and 740 g of 30% aqueous solution of ammonium fluoride were charged, and heated in an oil bath of 120° C. with stirring.

With the rise of the temperature of the reaction solution, the water containing ammonia began to be distilled off. While causing the distilled liquid to be absorbed by an aqueous solution of hydrochloric acid, the reaction solution was continuously stirred under heating for 7 hours until the temperature thereof became to 98° C. During this time, 60 g of ammonia was collected outside the reaction system.

After the reaction solution was allowed to stand so as to be cooled to room temperature, the precipitates were filtered out and dried to obtain 150 g of precipitates. The precipitates were dissolved in hot water and filtered under heating and the filter cake was removed. By the recrystallization from the mother liquor, 50 g of the crystals of ammonium silicofluoride was obtained.

In 384 g of pure water were dissolved 36 g of the crystals of ammonium silicofluoride, and 60 g of a high-purity ammonia water (produced by Nissan Chemical Industries, Ltd., concentration: 28%) was added thereto at room temperature. After the ammonia water was added, the reaction mixture was stirred for 30 minutes to obtain a silica. The silica was filtered out, washed with water and dried at 105° C. to obtain 11 g of a silica powder.

The contents (%) of impurities in the raw material of silica fume and the silica powder obtained are shown in the followings.

|              | $Al_2O_3$ | $Fe_2O_3$ |
|---|---|---|
| Raw material | 1.5    | 3.9    |
| Product      | <0.01  | <0.01  |

EXAMPLE 2

In the same way as in Example 1, 600 g of diatomaceous earth (Toalite; trade name, produced by Toa Kasei, containing 77.4% of $SiO_2$) as a crude silica and 7400 g of 24% aqueous solution of ammonium fluoride were charged into a 10-1 Teflon container and continuously heated in an oil bath of 120° C. with stirring for 9.5 hours until the temperature thereof became 98° C.

During this time, 400 g of ammonia was collected outside the reaction system. By filtering out the filter cake under heating, and purifying by recrystallization from the mother liquor, 550 g of primary crystals of ammonium silicofluoride were obtained. Further, 200 g of secondary crystals were obtained. In 2020 g of pure water were dissolved 360 g of the primary crystals of ammonium silicofluoride, and 170 g of ammonia gas was introduced at room temperature for 3 hours to produce a silica.

The slurry obtained was filtered under a pressure so as to collect the mother liquor, and the cake was washed with water and dried at 105° C. to obtain 110 g of a silica powder.

The contents (%) of impurities in the raw material of diatomaceous earth and the silica powder obtained are shown in the followings.

|  | $Al_2O_3$ | $Fe_2O_3$ | CaO | MgO | $Na_2O$ |
|---|---|---|---|---|---|
| Raw material | 1.42 | 1.30 | 0.07 | 0.25 | 0.42 |
| Product | <0.01 | <0.1 | <0.01 | <0.01 | <0.01 |

EXAMPLE 3

Into a 2-1 Teflon container equipped with an agitating element and a thermometer were charged 120 g of diatomaceous earth (Toalite; trade name, produced by Toa Kasei, containing 83.6% of $SiO_2$) as a crude silica and 1600 g of the mother liquor (concentration of ammonium fluoride: about 18%) obtained in Example 2 by filtering under a reduced pressure the slurry produced by the reaction for producing a silica as an aqueous solution of ammonium fluoride, and 100 g of crystals containing ammonium silicofluoride as the main ingredient were obtained in the same way as in Example 1.

In pure water were dissolved 36 g of the crystals, and 17 g of ammonia gas was introduced at room temperature for 25 minutes to produced a silica. The slurry obtained was filtered under a reduced pressure, and the cake was washed with water and dried at 105° C. to obtain 10 g of a silica powder having a high purity.

The contents (%) of impurities in the material diatomaceous earth and the silica powder obtained are shown in the followings.

|  | $Al_2O_3$ | $Fe_2O_3$ | CaO | MgO |
|---|---|---|---|---|
| Raw material | 1.42 | 1.30 | 0.07 | 0.25 |
| Product | <0.01 | <0.1 | <0.01 | <0.01 |

EXAMPLE 4

Into a 1-1 Teflon container equipped with an agitating element and a thermometer, 65 g of a silica produced by a sodium silicate process (Carplex 80; trade name, produced by Shionogi & Co., Ltd., containing 87.5% of $SiO_2$) as a crude silica and 735 g of 30% aqueous solution of ammonium fluoride were charged, and heated in an oil bath of 140° C. with stirring.

With the rise of the temperature of the reaction mixture, the water containing ammonia began to be distilled off. The reaction mixture was continuously stirred under heating for 9 hours until the temperature thereof became to 98° C. 57 g of ammonia was collected outside the reaction system.

To 264 g of obtained slurry is added 354 g of hot water, and the slurry was filtered at 80° C. to remove the filter cake. 611 g of the filtrate was allowed to stand so as to be cooled to room temperature, and was centrifuged to obtain 115 g of wet crystals of ammonium silicofluoride.

The crystals of ammonium silicofluoride were dissolved in 565 g of pure water and 192 g of 25% ammonia water was added thereto at room temperature. After the ammonia water was added, the reaction mixture was stirred for 30 minutes to obtain a silica. The silica was filtered out, washed with water and dried at 105° C. to obtain 36 g of a silica powder.

The contents of metal impurities in the raw material of the crude silica and the silica powder obtained are shown in the followings.

|  | Metal impurities (ppm) | | | |
|---|---|---|---|---|
|  | Al | Fe | Ca | Na |
| Raw material | 1437 | 146 | 50 | 2324 |
| Product | 14.2 | 6.7 | 0.7 | 4.0 |

To a slurry obtained in the same way as the above was added 2% nitric acid to adjust pH to 1.2. Then the slurry was filtered and dried to obtain a silica. The content of impurities in the obtained silica were analyzed, and each of contents of Al, Fe, Ca and Na was not more than 5 ppm.

EXAMPLE 5

Into a 5-1 Teflon container equipped with an agitating element and a thermometer, 60 g of silicic anhydride, (M-20; trade name, produced by Morimura Shoji, containing 99.8% of $SiO_2$) as a crude silica and 2680 g of 21% aqueous solution of ammonium fluoride were charged, and heated in an oil bath of 140° C. with stirring.

With the rise of the temperature of the reaction mixture, the water containing ammonia began to be distilled off. The reaction mixture was continuously stirred under heating for 6 hours at 100° C. of the temperature thereof. 41 g of ammonia was collected outside the reaction system.

After the slurry was allowed to stand so as to be cooled to room temperature, an insoluble matter (dry weight: 20 g) was removed as a filter cake by filtering under a reduced pressure to obtain 1964 g of a filtrate. To the filtrate was added 102 g of 25% ammonia water at room temperature. After the ammonia water was added, the reaction mixture was stirred for an hour to obtain a silica. The silica was filtered out, washed with water and dried at 105° C. to obtain 33 g of a silica powder.

The contents of metal impurities in the raw material of silicic anhydride and the silica powder obtained, and properties thereof are shown in the followings.

| Metal impurities (ppm) |
|---|

-continued

|  | Al | Fe | Ca | Na |
|---|---|---|---|---|
| Raw material | 50.8 | 19.9 | 24.7 | <1.0 |
| Product | <10.0 | <10.0 | <5.0 | <1.0 |

|  | Specific surface area ($m^2/g$) | Average particle size ($\mu m$) | Ignition loss (%) |
|---|---|---|---|
| Raw material | <1 | 23.0 | <0.2 |
| Product | 180 | 11.0 | 7.0 |

EXAMPLE 6

Into a 10-l Teflon container equipped with an agitating element and a thermometer, 420 g of a silica sand (MK silica; trade name, produced by Kyoritsu Ceramic Materials, containing 99.8% of $SiO_2$) as a crude silica, 6480 g of 30% aqueous solution of ammonium fluoride and 304 g of 46% aqueous solution of hydrofluoric acid were charged, and heated in an oil bath of 140° C. with stirring.

With the rise of the temperature of the reaction mixture, the water containing ammonia began to be distilled off. The reaction mixture was continuously stirred under heating for 10 hours at 101° C. of the temperature thereof 272 g of ammonia was collected outside the reaction system.

To 4000 g of the obtained slurry was added 2000 g of hot water, and the slurry was filtrated at 80° C. to remove 68 g of a filter cake. After 5830 g of filtrate was allowed to stand so as to be cooled to room temperature, precipitated crystals was filtrated to obtain 914 g of wet crystals. A part (14 g) of the wet crystals was dried by hot air to obtain 11 g of crystals, and the crystals were identified as ammonium silicofluoride by X-ray diffraction analysis. Each of the contents of Al, Fe, Ca and Na in the crystals was not more than 30 ppm. The crystals (900 g) were dissolved in 2136 g of pure water, and 312 g of ammonia gas was introduced at 50° C. for 1 hour to produce a silica. The slurry was filtered under a reduced pressure to collect 1920 g of filtrate. The filter cake was washed with water, diluted sulfuric acid and water, and dried at 105° C. to obtain 239 g of a silica powder.

The contents of metal impurities in the raw material of silica sand and the silica powder obtained, and properties thereof are shown in the followings.

|  | Metal impurities (ppm) | | | Water dispersibility |
|---|---|---|---|---|
|  | Al | Fe | Ca | |
| Raw material | 11 | 11 | 107 | Poor |
| Product | 7 | 5 | 4 | Good |

|  | Specific surface area ($m^2/g$) | Average particle size ($\mu m$) | Ignition loss (%) |
|---|---|---|---|
| Raw material | <1 | 95 | <0.2 |
| Product | 48 | 14 | 7.2 |

The silica sand of the raw material settled immediately in water, but the obtained silica powder dispersed and did not settle immediately in water.

The contents of an ammonia component and a fluorine component in the filtrate obtained by filtration under a reduced pressure were 15.0% expressed as $NH_3$ and 15.5% expressed as F, respectively.

EXAMPLE 7

Into a 1-l Teflon container equipped with an agitating element and a thermometer, 60 g of a silica sand (MK silica; trade name, produced by Kyoritsu Ceramic Materials, containing 99.8% of $SiO_2$) as a crude silica and 740 g of 30% aqueous solution of ammonium fluoride were charged, and heated in an oil bath of 140° C. with stirring.

With the rise of the temperature of the reaction mixture, the water containing ammonia began to be distilled off. The reaction mixture was continuously stirred under heating for 18 hours at 90° to 104° C. of the temperature thereof, while adding 541 g of pure water during the reaction. 57 g of ammonia was collected outside the reaction system.

To 273 g of the obtained slurry was added 327 g of hot water, and the slurry was filtrated at 80° C. to remove 10.2 g of a filter cake. To 513 g of the hot filtrate was added 487 g of pure water. To the solution, 68 g of ammonia gas was introduced for 1 hour under cooling in an ice bath to produce a silica. The silica was filtered out, washed with water and dried at 105° C. to obtain 50 g of a silica powder.

The contents of metal impurities in the raw material of silica sand and the silica powder obtained, and properties thereof are shown in the followings.

|  | Metal impurities (ppm) | | | |
|---|---|---|---|---|
|  | Al | Fe | Ca | Na |
| Raw material | 11 | 11 | 107 | 4 |
| Product | 5.4 | 8.1 | 1.0 | 0.3 |

|  | Specific surface area ($m^2/g$) | Average particle size ($\mu m$) | Water dispersibility | Ignition loss (%) |
|---|---|---|---|---|
| Raw material | <1 | 95 | Poor | <0.2 |
| Product | 150 | 15 | Good | 6.8 |

EXAMPLE 8

Into a 500-ml reaction container equipped with an agitating element and a thermometer, 13 g of a silica produced by a sodium silicate process (Carplex 80; trade name, produced by Shionogi & Co., Ltd., containing 87.5% of $SiO_2$) as a crude silica, 147 g of 30% aqueous solution of ammonium fluoride (prepared from 45 g of ammonium fluoride (first grade reagent) produced Kanto Chemical, and 102 g of pure water) and 84 g of 70% sulfuric acid were charged, and mixed under cooling in an ice bath. The temperature of the mixture rises to 52° C. from 22° C. during the mixing. The mixture was heated in an oil bath of 130° C. with stirring. The silica of the raw material was dissolved wholly at 80° C. of temperature of the mixture. The reaction mixture was concentrated for 2 hours under heating to separate out crystals, while causing the distilled liquid to be absorbed in 100 g of pure water. The solution allowed to stand so as to be cooled to room temperature and 150 g of a concentrated slurry was obtained. The weight of the solution which absorbed the distillate increased to 192 g, pH of the solution was 3 to 4, and the content of a fluorine component in the solution is 117 ppm, expressed as F. When 100 g of 25% ammonia water was added to the solution, no silica was produced. The crystals in the concentrated slurry were filtered to obtain 69 g of wet crystals. The wet crystal was purified by recrystallization with using a hot water, and 30 g (wet weight) of ammonium silicofluoride was obtained. The obtained ammonium silicofluoride was dried overnight under 105° C. to obtain 25 g of a dry preparation. The dry preparation was dissolved in 102 g of pure water, and 97 g of 25% ammonia water was added for 30 minutes under cooling in an ice bath to produce a silica. The silica was filtered under a reduced pressure and washed with water, and the obtained silica cake was dried at 105° C. to obtain 8 g of a silica powder. Each of the contents of Al, Fe, Ca and Na in the obtained silica was not more than 10 ppm.

EXAMPLE 9

Into a 1-l Teflon container equipped with an agitating element and a thermometer, 127 g of acid ammonium fluoride (special grade reagent, produced Kanto Chemical), 319 g of pure water and 87 g of 46% hydrofluoric acid were charged to prepare a solution containing 37.9 g (7.1% of the solution) of an ammonia component, expressed as $NH_3$, and 122.7 g (23.0% of the solution) of a fluorine component, expressed as F.

To the solution, 60 g of a silica sand (MK silica; trade name, produced by Kyoritsu Ceramic Materials, containing 99.8% of $SiO_2$) was added at room temperature. No heat was generated during mixing. The mixed slurry was heated for 1 hour at 72° to 84° C. in an oil bath. The reaction mixture was filtered at 75° C. to collect 55 g of a wet filter cake. The filtrate was allowed to stand so as to be cooled to room temperature, precipitated crystals was filtrated under a reduced pressure and dried to obtain 75 g of wet crystals of ammonium silicofluoride. A part of the wet crystals was dried at 105° C. and the contents of metal impurities were measured. Each of the contents were not more than 10 ppm. The obtained crystal (45 g) was dissolved in water to make 10% aqueous solution. To the solution was added 170 g of 25% ammonia water for 10 minutes at room temperature. After the ammonia water was added, the reaction mixture was further stirred for 20 minutes to obtain a silica. The silica was filtered out, washed with water and dried at 105° C. to obtain 15 g of a primary silica powder.

The contents of impurities in the raw material of silica sand and the silica powder obtained, and properties thereof are shown in the followings.

|  | Metal impurities (ppm) | | | |
| --- | --- | --- | --- | --- |
|  | Al | Fe | Ca | Na |
| Raw material | 11 | 11 | 107 | 4 |
| Product | 1.0 | 3.0 | 2.1 | 0.3 |
|  | Specific surface area ($m^2/g$) | Average particle size (μm) | Water dispersibility | Ignition loss (%) |
| Raw material | <1 | 95 | Poor | <0.2 |
| Product | 185 | 14.5 | Good | 7.2 |

From a solution obtained by washing the filter cake obtained above with pure water was also produced 14 g of a high-purity silica.

EXAMPLE 10

From 1500 g of the filtrate obtained in Example 6 by filtration under a reduced pressure to produce a silica (containing about 30% of ammonium fluoride, 15.0% of an ammonia component (expressed by $NH_3$) and 15.5% of a fluorine component (expressed by F)), ammonia was removed by using a cation exchange resin (Amberlite 120 B; trade name, produced by Organo Co., Ltd.) to obtain 1200 g of 10% hydrofluoric acid solution.

Into a 10-l Teflon container equipped with an agitating element and a thermometer were charged a 800 g of the 10% hydrofluoric acid solution and 247 g of the filtrate obtained by filtration under a reduced pressure in Example 6, and 60 g of a silicic anhydride (M-20; trade name, produced by Morimura Shoji, containing 99.8% of $SiO_2$) was added at room temperature. No heat was generated at room temperature. The mixture was heated for 1 hour at 80 to 95° C. in an oil bath with stirring. The obtained slurry was filtered at 80° C. to collect a filter cake (9 g after dried). After the filtrate was allowed to stand so as to be cooled to room temperature, precipitated crystals were filtrated under a reduced pressure and dried at 105° C. to obtain 90 g of crystals containing ammonium silicofluoride as a main ingredient.

In 355 g of pure water was dissolved 45 g of the obtained crystals. To the obtained solution was introduced 34 g of ammonia gas for 1 hour under cooling in an ice bath to produce a silica. The silica was filtered out, washed with water and dried at 105° C. to obtain 14 g of a silica powder. Each of the contents of Al, Fe, Ca and Na in the obtained silica was not more than 5 ppm.

EXAMPLE 11

Into a 1-l Teflon container equipped with an agitating element and a thermometer, 26 g of a silica sand (MK silica; trade name, produced by Kyoritsu Ceramic Materials, containing 99.8% of $SiO_2$) as a crude silica, 397 g of the filtrate obtained in Example 6 by filtration under a reduced pressure to produce a silica (containing about 30% of ammonium fluoride) and 129 g of aqueous solution of hydrofluoric acid (prepared from 40% reagent produced by Hashimoto Chemical) were charged, and heated in an oil bath of 140° C. with stirring.

With the rise of the temperature of the reaction mixture, the water containing ammonia began to be distilled off. The reaction mixture was continuously stirred under heating for 8 hours at 95° to 101° C. of the temperature thereof. 13.5 g of ammonia was collected outside the reaction system.

From 266 g of the obtained slurry, 9 g of a silica powder was obtained in the same way as Example 6.

The contents of metal impurities in the raw material of silica sand were similar to those in Example 6. Each of the contents of metal impurities (Al, Fe and Ca) in the obtained silica was not more than 10 ppm. A specific surface area, an average particle size and a ignition loss of the obtained silica powder were 60 $m^2/g$, 13 μm and 7.0%, respectively.

EXAMPLE 12

Into a 0.5-l reaction container equipped with an agitating element and a thermometer, 26 g of a silica sand (MK silica; trade name, produced by Kyoritsu Ceramic Materials, containing 99.8% of $SiO_2$) as a crude silica and 463 g of 30% aqueous solution of ammonium fluoride were charged, and the pressure of the reaction system was reduced by a handy aspirator under heating in a oil bath.

The reaction mixture began to boil at 80° C. of the reaction mixture and at 320 mmHg of absolute pressure. The distillate was collected into 10% aqueous sulfonic acid through a condenser from the reaction system.

The reaction mixture was concentrated for 4 hours under heating at 77° to 82° C. 279 g of distillate solution containing 17 g of ammonium component, expressed as NH$_3$, was collected. To 206 g of the obtained slurry was added 294 g of pure water, and the slurry was filtered at 60° C. to remove the unreacted silica and insoluble impurities. To 478 g of the obtained filtrate was introduced 170 g of 25% ammonia water at 50° C. for 30 minutes to produce a silica. The silica was filtered out, washed with water and dried at 105° C. to obtain 14 g of a silica powder.

The purity of the obtained silica is superior to the silica of the raw material. The obtained silica powder has a specific surface area of 35 m$^2$/g and an average particle size of 14 μm. The silica having different properties from the silica of the raw material was obtained.

What is claimed is:

1. A process for producing a high-purity silica which comprises:
   I) reacting a crude silica with ammonium fluoride or a mixture of ammonium fluoride and acid ammonium fluoride in an aqueous medium to produce ammonium silicofluoride;
   II) separating said ammonium silicofluoride from an unreacted silica and impurities by means of a solid/liquid separation; and
   III) reacting said separated ammonium silicofluoride in said aqueous medium with ammonium to produce a silica having an Al$_2$O$_3$ content of <0.01 wt. %.

2. The process of claim 1, wherein said reaction of said crude silica with said ammonium fluoride or said mixture of ammonium fluoride and acid ammonium fluoride is carried out at a temperature of not less than 50° C.

3. The process of claim 1, wherein said separation step ii) is carried out at a temperature of not less than 50° C.

4. The process of claim 1, wherein said separated ammonium silicofluoride is crystallized and separated from said aqueous medium before reacting with ammonia.

5. The process of claim 4, wherein said crystallized ammonium silicofluoride is recrystallized before reacting with ammonia.

6. The process of claim 1, wherein said mixture of ammonium fluoride and acid ammonium fluoride is obtained by deammoniation of ammonium fluoride by using a cation exchange resin.

7. The process of claim 1, wherein said ammonium silicofluoride is separated from said unreacted silica and said impurities in the state that said ammonium silicofluoride is dissolved in said aqueous medium.

8. The process of claim 1, wherein a silica slurry which is obtained by the reaction of said separated ammonium silicofluoride with ammonia, or a silica cake which is obtained by filtering said silica slurry is washed with an acid solution.

9. The process of claim 1, wherein ammonium fluoride produced during the reaction of said separated ammonium silicofluoride with said ammonia is recycled to step i).

* * * * *